(12) United States Patent
Zhang et al.

(10) Patent No.: US 11,217,846 B2
(45) Date of Patent: Jan. 4, 2022

(54) ELECTROCHEMICAL CELL

(71) Applicant: EaglePicher Technologies, LLC, Joplin, MO (US)

(72) Inventors: Dong Zhang, Webb City, MO (US); Jason A Mudge, Joplin, MO (US); David Timothy Andrew Darch, Neosho, MO (US); Destephen Mario, Joplin, MO (US); Ernest Ndzebet, Carl Junction, MO (US); Umamaheswari Janakiraman, Webb City, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 0 days.

(21) Appl. No.: 15/924,158

(22) Filed: Mar. 16, 2018

(65) Prior Publication Data

US 2018/0269437 A1    Sep. 20, 2018

Related U.S. Application Data

(60) Provisional application No. 62/472,522, filed on Mar. 16, 2017.

(51) Int. Cl.
*H01M 50/147*    (2021.01)
*H01M 4/583*    (2010.01)
(Continued)

(52) U.S. Cl.
CPC ........... *H01M 50/147* (2021.01); *H01M 4/06* (2013.01); *H01M 4/364* (2013.01); *H01M 4/382* (2013.01);
(Continued)

(58) Field of Classification Search
CPC ... H01M 2/00–0235; H01M 2004/028; H01M 4/742; H01M 6/00–52;
(Continued)

(56) References Cited

U.S. PATENT DOCUMENTS 4,482,615 A    11/1984   Rosansky et al.
4,752,541 A *  6/1988   Faulkner .......... H01M 10/0563
                                                    205/59

(Continued)

FOREIGN PATENT DOCUMENTS

DE    3707216 C1    6/1988
JP    H01294373 A * 11/1989
(Continued)

OTHER PUBLICATIONS

EPO machine generated English translation of JPH01294373A (Year: 1989).*

(Continued)

*Primary Examiner* — Christopher P Domone
*Assistant Examiner* — Kimberly Wyluda
(74) *Attorney, Agent, or Firm* — Cantor Colburn LLP

(57) ABSTRACT

An electrochemical cell that converts chemical energy to electrical energy includes a cathode with an active material of fluorinated carbon on a perforated metal cathode current collector, a lithium anode on a perforated metal anode current collector, a stepped header, a stable electrolyte, and a separator. In various embodiments, an anode current collector design, a cathode current collector design, a stepped header design, a cathode formulation, an electrolyte formulation, a separator, and a battery incorporating the electrochemical cell are provided.

26 Claims, 10 Drawing Sheets

(51) Int. Cl.
*H01M 4/62* (2006.01)
*H01M 6/16* (2006.01)
*H01M 4/36* (2006.01)
*H01M 4/06* (2006.01)
*H01M 50/183* (2021.01)
*H01M 50/636* (2021.01)
*H01M 4/38* (2006.01)
*H01M 50/172* (2021.01)
*H01M 4/02* (2006.01)
*H01M 4/80* (2006.01)
*H01M 4/66* (2006.01)

(52) U.S. Cl.
CPC ......... *H01M 4/5835* (2013.01); *H01M 4/623* (2013.01); *H01M 4/625* (2013.01); *H01M 4/80* (2013.01); *H01M 6/16* (2013.01); *H01M 6/166* (2013.01); *H01M 50/172* (2021.01); *H01M 50/183* (2021.01); *H01M 50/636* (2021.01); *H01M 4/663* (2013.01); *H01M 4/667* (2013.01); *H01M 2004/027* (2013.01); *H01M 2004/028* (2013.01); *H01M 2220/30* (2013.01); *H01M 2300/0037* (2013.01)

(58) Field of Classification Search
CPC ......... H01M 4/133–134; H01M 4/663; H01M 4/621–626; H01M 4/745; H01M 4/64–745; H01M 2/0404; H01M 2/06; H01M 2/08; H01M 2/365; H01M 4/06; H01M 4/364; H01M 4/382; H01M 4/5835; H01M 4/623; H01M 4/625; H01M 4/80; H01M 4/667; H01M 6/16; H01M 6/166; H01M 2004/027; H01M 2220/30; H01M 2300/0037; H01M 50/147; H01M 50/183; H01M 50/172
See application file for complete search history.

(56) References Cited

U.S. PATENT DOCUMENTS

| | | |
|---|---|---|
| 5,171,648 A | 12/1992 | Beard |
| 5,458,994 A | 10/1995 | Nesselbeck et al. |
| 5,536,279 A | 7/1996 | Nesselbeck et al. |
| 5,614,331 A | 3/1997 | Takeuchi et al. |
| 5,849,430 A * | 12/1998 | Lee .................. H01M 4/742 429/94 |
| 6,171,729 B1 | 1/2001 | Gan et al. |
| 6,451,483 B1 * | 9/2002 | Probst ................ H01M 6/16 429/231.7 |
| 6,783,888 B2 | 8/2004 | Gan et al. |
| 7,611,805 B2 | 11/2009 | Frustaci et al. |
| 7,882,622 B2 | 2/2011 | Polsonetti et al. |
| 7,927,737 B2 | 4/2011 | Scott et al. |
| 9,077,030 B2 | 7/2015 | Norton et al. |
| 9,466,838 B2 | 10/2016 | Reddy et al. |
| 9,559,353 B2 | 1/2017 | Norton et al. |
| 2002/0012844 A1 * | 1/2002 | Gan .................. H01M 4/36 429/231.7 |
| 2003/0194601 A1 | 10/2003 | Lei |
| 2003/0211388 A1 | 11/2003 | Ruth et al. |
| 2004/0031142 A1 | 2/2004 | Paulot et al. |
| 2004/0101762 A1 | 5/2004 | Noh |
| 2006/0247714 A1 | 11/2006 | Taylor et al. |
| 2009/0321107 A1 | 12/2009 | Taylor et al. |
| 2009/0325076 A1 | 12/2009 | Matsui et al. |
| 2011/0076555 A1 * | 3/2011 | Jeong ............... H01M 50/147 429/185 |
| 2011/0151310 A1 * | 6/2011 | Pyszczek ........... H01M 2/0207 429/153 |
| 2011/0311866 A1 | 12/2011 | Lim et al. |
| 2012/0070746 A1 * | 3/2012 | Mikhaylik ......... H01M 2/1673 429/231.95 |
| 2013/0230764 A1 | 9/2013 | Park et al. |
| 2015/0004487 A1 * | 1/2015 | Lee .................. H01M 4/505 429/215 |
| 2015/0372317 A1 * | 12/2015 | Pozin .................. H01M 4/50 702/63 |
| 2016/0043402 A1 * | 2/2016 | Hagiyama ......... H01M 10/0468 429/163 |
| 2016/0133887 A1 * | 5/2016 | Suzuki ............... H01M 50/10 429/179 |
| 2016/0133932 A1 | 5/2016 | Liang et al. |
| 2017/0036031 A1 | 2/2017 | Norton et al. |
| 2017/0104207 A1 | 4/2017 | Rubino et al. |
| 2017/0309918 A1 | 10/2017 | Roumi et al. |
| 2018/0019477 A1 * | 1/2018 | Woo .................. H01M 4/366 |
| 2018/0159113 A1 * | 6/2018 | Voss .................. H01M 2/0202 |
| 2019/0006670 A1 * | 1/2019 | Gunji .................. C01G 53/00 |
| 2019/0140220 A1 * | 5/2019 | Jiang ................ H01M 50/172 |
| 2019/0245249 A1 | 8/2019 | Otohata |
| 2021/0167349 A1 | 6/2021 | Zhang et al. |

FOREIGN PATENT DOCUMENTS

| | | |
|---|---|---|
| JP | 2004172084 A | 6/2004 |
| JP | 2012004121 A | 5/2012 |
| JP | 5314359 B2 | 10/2013 |
| JP | 2017152243 A | 8/2017 |
| WO | 2014092262 A1 | 6/2014 |

OTHER PUBLICATIONS

Perforated current collector foils for Li-ion batteries-Jun. 2012—Fraunhofer Institute for Laser Technology ILT, DQS certified by DIN EN ISO 9001, Reg.-No. DE-69572-01, obtained from: www.ilt.fraunhofer.de, on Sep. 9, 2020, 1 page.

* cited by examiner

ELECTROCHEMICAL CELL

CROSS-REFERENCE TO RELATED APPLICATIONS

The present Utility patent application claims the priority benefit of the U.S. provisional application Ser. No. 62/472,522, filed on Mar. 16, 2017 under 35 U.S.C. 119(e). The contents of this related provisional application are incorporated herein by reference for all purposes to the extent that such subject matter is not inconsistent herewith or limiting hereof.

BACKGROUND

The present inventions relate generally to the field of electrochemical cells. More particularly, the present inventions relate to lithium/fluorinated carbon (Li/CF$_x$) electrochemical cells for use in implantable medical devices.

Li/CF$_x$ electrochemical cells are known to be used in multitude of devices including implantable medical devices. These electrochemical cells are known to swell during discharge. However, in the design of a medical device, more particularly an implantable medical device, the swelling may need to be controlled. The control on swelling may be needed to ensure that enough space is reserved for the cell volume change in order to prevent damage to the device circuitry. Consequently, the more swelling the cell experiences, the more void space may be needed to be reserved in the device, leading to greater total device volume. The swelling may result in capacity loss due to lack of electrolyte in contact with some solid particles (that is, loss of interface between solids and electrolyte).

In the art there are references to the minimization or elimination of swelling in Li/CF$_x$ cells discharged under high rate applications. When CF$_x$ materials are synthesized from fibrous carbonaceous materials, in comparison to petroleum coke, cell swelling may be greatly reduced, and in some cases eliminated. It is believed that the Li/CF$_x$ cell is known to produce a cathode swelling that may result in mechanical deformation of the cell. References in the art report the cathode swelling as a function of discharge depth, rate, and temperature. A mechanism in which the discharge product is LiF deposited on the internal surfaces of the carbon layers left behind after electrochemical reduction with this deposition leading directly to the measured cathode swelling is also proposed in the art.

In view of the foregoing, it is clear that these traditional techniques are not perfect and leave room for more optimal approaches. Particularly, in the field of implantable medical devices, a smaller total device volume may be desired and hence it may be desirable to minimize the extent of swelling in Li/CF$_x$ electrochemical cells.

SUMMARY OF THE INVENTION

In one embodiment, the present invention describes an electrochemical cell that converts chemical energy to electrical energy. Particularly, the invention pertains to an electrochemical cell having a cathode with an active material of fluorinated carbon on a perforated metal cathode current collector, a lithium anode on a perforated metal anode current collector, a stepped header, a stable electrolyte, and a separator. In various embodiments, the invention provides an anode current collector design, a cathode current collector design, a stepped header design, a cathode formulation, an electrolyte formulation, a separator, and a battery incorporating the electrochemical cell.

In one embodiment, the swelling of the cell after discharge to zero volt is less than or equal to about 2 percent.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
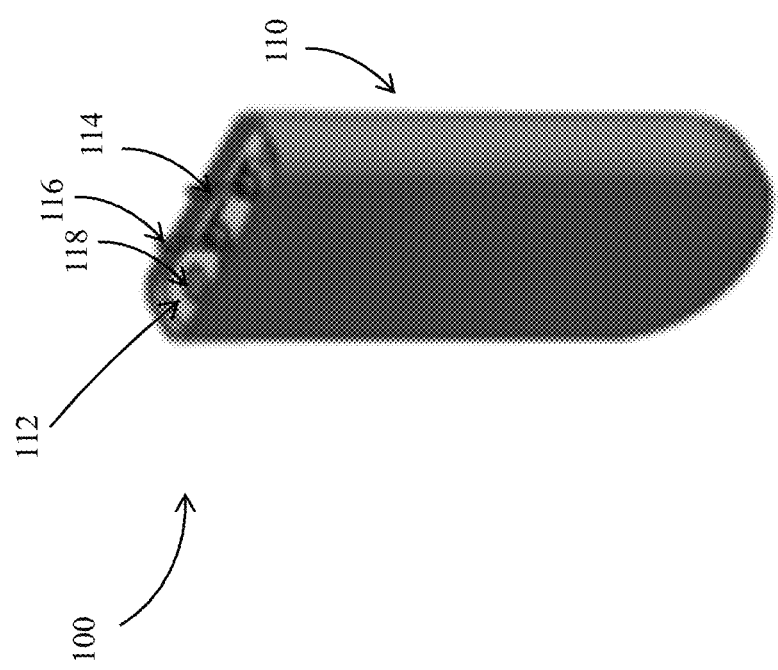
FIG. 1 illustrates a perspective view of a finished electrochemical cell, in accordance with an embodiment of the present invention.

Unless otherwise indicated illustrations in the figures are not necessarily drawn to scale.

DETAILED DESCRIPTION

The present invention is best understood by reference to the detailed figures and description set forth herein.

Embodiments of the invention include a primary lithium-based electrochemical cell. It may be appreciated that those skilled in the art will, in light of the teachings of the present invention, understand that the term "primary" denotes a non-rechargeable electrochemical cell, in contrast to the term "secondary" which denotes a rechargeable electrochemical cell. As used herein, a battery, may consist of one or more of the primary electrochemical cells. Typically, primary lithium batteries are those having metallic lithium anode, pairing with various cathodes, including Li/CF$_x$, Li/MnO$_2$, Li/SVO, and Li/Hybrid, where Hybrid is a mixture of CF$_x$, and/or MnO$_2$, and/or SVO.

During the discharge of such a battery, the oxidation of the lithium metal to lithium ions takes place at the anode according to the following reaction:

$$Li \rightarrow Li^+ + e$$

The reduction of the oxidizing substance occurs at the cathode. In the case where the oxidizing agent is $CF_x$, the reduction reaction is as follows:

$$CF_x + e + xLi^+ \rightarrow C + xLiF$$

During discharge, the oxidation of the lithium metal to lithium ions occurs at the anode, and the lithium ions leave anode surface and migrate into the porous cathode. At the cathode during discharge, the insertion of lithium into $CF_x$ takes place, producing insoluble lithium fluoride and graphite (an electronic conductor).

For example, a theoretical calculation on electrode dimension change during discharge may be done in the following manner. Carbon monofluoride ($CF_x$) is used as the cathode active material for the present inventions. The overall discharge reaction in a Li/$CF_x$ cell is shown in the following equation I.

$$xLi + CF_x \rightarrow C + xLiF \quad \text{(Equation 1)}$$

Table 1 provided below shows the data for volume expansion for the cathode, in an exemplary embodiment. Based on the data in Table 1, for the discharge reaction given in equation (1) with the molar volume of $CF_{1.0}$ at 11.2 cubic centimeter per mole (2.8 grams per cubic centimeter), LiF at 9.8 centimeter per mole (2.65 grams per cubic centimeter), and C at 6.0 centimeter per mole (2.0 grams per cubic centimeter), the volume expansion for the cathode may be calculated to about 41 percent for a complete discharge. On the other hand, the Li anode will be completely dissolved by anodic reaction, as shown in Table 1, and the volume expansion of anode is about −100 percent (minus 100 percent). Based on the molar volume of each species in equation (1), if one combines the volume changes on both cathode side and anode side, the net expansion for the whole cell (as provided in Table 1) is about −34.7 percent (minus 34.7 percent), assuming the capacity ratio of anode to cathode is 1:1.

TABLE 1

Theoretical calculation for cell dimension change during discharge

| Reaction | Species | Density (g/cm³) | Molar Volume (cm³/mole) | Volume Expansion* |
|---|---|---|---|---|
| Cathode $CF_{1.0} \rightarrow C + LiF$ | $CF_{1.0}$ | 2.8 | 11.2 | 41% |
|  | C | 2.0 | 6.0 | (6.0 + 9.8 − 11.2)/11.2 |
|  | LiF | 2.65 | 9.8 |  |
| Anode Li → Li⁺ | Li | 0.534 | 13.0 | −100% |
| Cell $CF_{1.0} + Li \rightarrow C + LiF$ | NA | NA | NA | −34.7% (6.0 + 9.8 − 11.2 − 13.0)/(11.2 + 13.0) |

*Assuming the capacity ratio of anode to cathode is 1:1

One skilled in the art may appreciate that the above calculation takes into account only the active materials in the electrochemical cell. It does not consider change in the volume of cathode binder and cathode conductive filler and change in the gap between $CF_x$ particles and carbon particles. However, the negative volume change in the solid phase may create more void space between solid particles. Therefore, while discharge proceeds there may be a tendency of lack of electrolyte between the solids because the electrolyte volume is fixed and is equal to the initial value at undischarged state if the side reaction for electrolyte during the discharge is negligible. The above descriptions about change in the volume of reactants and products imply that the electrochemical reaction itself may not be the cause of the swelling of a Li/$CF_x$ cell. Instead, it is the electrochemical reaction that may lead to a shrinking of a Li/$CF_x$ cell. Accordingly, in various embodiments, if the factors, such as selection of cathode active material, optimized cathode and anode design, optimized value of electrolyte amount, are appropriately determined, the cell swelling may be minimized.

Embodiments of the invention are described below with reference to the Figures, experimental, and detailed description. However, those skilled in the art will readily appreciate that the detailed description given herein with respect to these figures and experimental is for explanatory purposes as the invention extends beyond these limited embodiments.

The singular forms "a", "an" and "the" include plural referents unless the context clearly dictates otherwise.

The term "optional" or "optionally" means that the subsequently described event or circumstance may or may not occur, and that the description includes instances where the event occurs and instances where it does not.

In one embodiment is provided, an electrochemical cell. The electrochemical cell includes a cathode, an anode, a header, and an electrolyte. The cathode includes a cathode formulation. The cathode formulation includes a cathode active material, a conductive carbon filler, and a binder. The cathode formulation is disposed on a cathode current collector. The anode comprises at least two lithium metal foils disposed on an anode current collector. The header includes a stepped header. The header includes at least two steps, wherein the first step is to fulfill the ball seal requirements, and the second step is to fulfill the glass sealing requirements. The electrolyte comprises a lithium salt in a mixed solvent. The ratio of an amount of electrolyte to an amount of cathode active material is about 0.7 to about 1.1. The cell has a swelling percentage of less than or equal to about 2 percent.

Referring to FIG. 1, a perspective view 100 of a finished electrochemical cell is illustrated, in accordance with an embodiment of the present invention. The electrochemical cell includes an outer casing 110, and a header 112. The header 112 includes a vent location 118, and pins 114 and 116 for external connection. Internally the pin 114 is connected to the cathode current collector (not shown in figure) and the pin 116 is connected to the anode current collector (not shown in figure).

In one embodiment, the cathode includes a cathode current collector. It may be appreciated that those skilled in the art will, in light of the teachings of the present invention, that the cathode current collector may include any suitable material known to be used in the art as a cathode current collector. Suitable materials may include, but are not limited to, stainless steel, aluminum, and titanium. In an exemplary embodiment, the material used for the cathode current collector is stainless steel, such as, for example, SS316, SS316L, SS304.

In one embodiment, the cathode current collector is perforated. In an exemplary embodiment, the perforation consists of large circles and small circles in order to maximize the void area while maintaining the current collector strength. The maximized void area is beneficial for enhancing the adhesion between the two halves of the cathode pellet sandwiching the current collector. The ratio of number of large circles to small circles is about 4:3. Alternatively, the void area can take other shapes, such as square, diamond, rectangular, and triangle. In one embodiment, the diameter for the large circles may be in a range of about 3.0 millimeter (mm) to about 2.0 mm. In another embodiment, the diameter for the large circles may be in a range of about 2.8 mm to about 2.2 mm. In yet another embodiment, the average diameter for the large circles may be in a range of about 2.6 mm to about 2.3 mm. In one embodiment, the average diameter for the large circles is about 2.4 mm. In one embodiment, the diameter for the small circles may be in a range of about 1.4 mm to about 2.5 mm. In another embodiment, the diameter for the small circles may be in a range of about 1.6 mm to about 2.3 mm. In yet another embodiment, the average diameter for the small circles may be in a range of about 1.8 mm to about 2.1 mm. In one embodiment, the average diameter for the small circles is about 1.9 mm.

As shown herein below with reference to FIG. 4, in one embodiment, the ratio of perforated area to the whole cathode current collector (excluding the tabbing area) may be in a range of about 0.40 to about 0.80 In another embodiment, the ratio of perforated area to the whole cathode current collector (excluding the tabbing area) may be in a range of about 0.50 to about 0.70 In yet another embodiment, the ratio of perforated area to the whole cathode current collector (excluding the tabbing area) may be in a range of about 0.55 to about 0.65 In one embodiment, the ratio of a perforated area to a whole area of cathode current collector (excluding the tabbing area) is about 0.60.

In one embodiment, the cathode current collector has a thickness. In one embodiment, the thickness of the cathode current collector may be in a range of about 0.002 mm to about 0.010 mm. In another embodiment, the thickness of the cathode current collector may be in a range of about 0.040 mm to about 0.090 mm. In yet another embodiment, the thickness of the cathode current collector may be in a range of about 0.060 mm to about 0.080 mm. In one embodiment, the thickness of the cathode current collector is about 0.075 mm.

In one embodiment, the cathode formulation comprises a cathode active material, at least one conductive carbon filler, and a binder. In one embodiment, the cathode active material employed in the cathode formulation includes electrochemically active fluorinated carbon, i.e., $CF_x$. In one embodiment, the $CF_x$ material may be blended with the binder and the conductive carbon to form a pellet. The pellet may then be disposed onto the cathode current collector, i.e., the pellet may be pressed onto the cathode current collector. In one embodiment, the conductive carbon filler may include carbon black.

Accordingly, in one embodiment, the cathode active material comprises fluorinated carbons represented by the formula $CF_x$, wherein x is a number between 0.1 and 2.0. The atomic weight of fluorine is 18.998 and the atomic weight of carbon is 12.011. The fluorination level of a given $CF_x$ material may be expressed as a percentage that represents the atomic weight contribution of the fluorine (18.998x) divided by the sum of the atomic weight contribution of the fluorine (18.998x) and the atomic weight contribution of the carbon (12.011). Thus, for $C_1F_1$ stoichiometry, the fluorination level would be 18.998/(18.998+12.011)=61.3 percent.

$CF_x$ is conventionally prepared from the reaction of fluorine gas with a crystalline or amorphous carbon. Graphite is an example of a crystalline form of carbon, while petroleum coke, coal coke, carbon black and activated carbon are examples of amorphous carbon. The reaction between fluorine and carbon is usually carried out at temperatures ranging from 300 degrees Celsius to 650 degrees Celsius in a controlled pressure environment. A variety of $CF_x$ materials are available from commercial sources, including materials derived from the fluorination of petroleum coke, carbon black and graphite.

Suitable examples of fluorinated carbons that may be used in forming a cathode as disclosed herein include, but are not limited to, fluorinated carbons that are based on different carbonaceous starting materials. For example, a cathode in accordance with the invention can be formed by a fluorinated petroleum coke. The fluorinated petroleum coke for use in the present invention is preferably fully fluorinated to a fluorination level of approximately 58 to 65 percent, with x value between 0.9 to 1.2. However, other fluorination levels could potentially also be used. Advantages of using petroleum coke based $CF_x$ material is that it is thermally stable in contact with electrolyte in a wide temperature range of about −40 degrees Celsius to about 70 degrees Celsius. The petroleum coke based $CF_x$ material is also found to be chemically stable in contact with electrolyte, leading to minimal or no side reactions that may generate gas species causing cell swelling. Suitable examples of the $CF_x$ material include but are not limited to Carbofluor® 1000 from Advanced Research Chemicals (Catoosa Okla.).

In one embodiment, as mentioned hereinabove, cathodes may include the usual non-electrochemically active materials, such as conductive fillers and a binder. In one embodiment, the conductive filler is carbon black, although graphite or mixtures of carbon black and graphite may also be used. In one embodiment, the conductive carbon filler used in the cathode formulation is also thermally and chemically stable. Suitable examples of the conductive carbon filler include, but are not limited to, Super P®-Li from TIMCAL. Metals such as nickel, aluminum, titanium and stainless steel in powder form may likewise be used. Suitable examples of binder include but is not limited to an aqueous dispersion of a fluorinated resin material, such as a polytetrafluoroethylene (PTFE) or polyvinylidene fluoride (PVDF). In one embodiment, the binding material is inert PTFE emulsion. It may be appreciated that those skilled in the art will, in light of the teachings of the present invention, that any suitable mixing ratio of the fluorinated carbon, the conductive filler, and the binder may be used. In an exemplary embodiment, the cathode may include, by weight, 90 percent of the fluorinated carbon material, 6.0 percent conductive filler and 4.0 percent binder.

During fabrication of the $CF_x$ cathode, the fluorinated carbon material, which comes in powder form, is blended with the conductive filler. The $CF_x$ and conductive filler are then combined with the binder by a wet process. The wetted cathode mixture is intimately blended, filtered and dried, then pressed into a cathode current collector as illustrated in FIG. 4. The current collector will assist in forming electrical conducting path between cathode and cell positive terminal and promote uniform utilization of the cathode material during discharge.

In one embodiment, the cathode current collector may be coated with conductive carbon. The coating is done before pressing the pellet. The conductive carbon coating may help to promote adhesion between the pellet (cathode formulation) and the cathode current collector, and to enhance the continuity of electrical conduction between the cathode current collector and the pellet. In one embodiment, the conductive carbon material may include, but not be limited to, graphite with a thermoplastic binder. In one embodiment, the conductive carbon coating on the cathode current collector may be obtained by application of a coating material such as commercially available Dag® EB-012 by Acheson Colloids Company. on the cathode current collector surface. Advantages of using the conductive coating includes reduction of cathode swelling. In one embodiment, the conductive carbon coating has a thickness. In one embodiment, the thickness of the conductive carbon coating may be in a range of about 0.040 . . . millimeter (mm) to about 0.0120 mm. In another embodiment, the thickness of the conductive carbon coating may be in a range of about 0.050 millimeter (mm) to about 0.100 mm. In yet another embodiment, the thickness of the conductive carbon coating may be in a range of about 0.060 millimeter (mm) to about 0.090 mm. In one embodiment, the thickness of the conductive carbon coating is about 0.080 mm.

In various embodiments, advantages of using a perforated cathode current collector include improved pellet cohesion around the edges of the perforations. Further the alignment tab, as described in FIG. 4, features a partially etched cut line which facilitates consistent pellet pressing while minimizing final tab length and interference with the tab to the header weld.

In one embodiment, the anode includes at least one lithium foil disposed on an anode current collector. It may be appreciated that those skilled in the art will, in light of the teachings of the present invention, that the anode current collector may include any suitable material known to be used in the art as an anode current collector. Suitable materials may include, but are not limited to, stainless steel, and copper. In an exemplary embodiment, the material used for the anode current collector is stainless steel, such as SS316, SS316L and SS304, as it has a high strength, high stability toward lithium metal and electrolyte, and good electric conductivity. In one embodiment, the anode current collector may include a perforated metal, an expanded metal, a grid, or a metallic fabric.

In one embodiment, the perforation consists of a diamond shape, a circle, an oval, a rectangle, a star, a triangle, and combinations thereof. In one embodiment, the average size of the perforation may be in a range of about 0.10 mm to about 0.20 mm. In another embodiment, the average size of the perforation may be in a range of about 0.12 mm to about 0.18 mm. In yet another embodiment, the average size of the perforation may be in a range of about 0.13 mm to about 0.17 mm. In one embodiment, the average size of the perforation is about 0.15 mm.

As shown herein below with reference to FIG. 5, in one embodiment, the percentage of perforated area to the whole anode current collector (excluding the tabbing area) may be in a range of about 30 percent to about 90 percent. In another embodiment, the percentage of perforated area to the whole anode current collector (excluding the tabbing area) may be in a range of about 40 percent to about 80 percent. In yet another embodiment, the percentage of perforated area to the whole anode current collector (excluding the tabbing area) may be in a range of about 50 percent to about 70 percent. In one embodiment, the percentage of a perforated area to a whole area of anode current collector (excluding the tabbing area) is about 60 percent. The advantage of the anode current collector is that, it may allow uniform utilization of lithium foils during discharge. At the same time, the perforated anode current collector may take up only a little amount of volume inside the cell, allowing maximization of the amount of electrochemically active components in the cell to generate high energy density.

In one embodiment, the total surface area of the anode current collector excluding the central folding and tabbing area is equal to or a little smaller than the area of the lithium foils. In one embodiment, the ratio of the surface area of the current collector (excluding the central folding and tabbing area) to the area of the lithium foils may be in a range of about 70 percent to about 100 percent. In another embodiment, the ratio of the surface area of the current collector (excluding the central folding and tabbing area) to the area of the lithium foils may be in a range of about 80 percent to about 100 percent. In yet another embodiment, the ratio of the surface area of the current collector (excluding the central folding and tabbing area) to the area of the lithium foils may be in a range of about 90 percent to about 100 percent. In one embodiment, the anode current collector has a thickness.

In one embodiment, the thickness of the anode current collector may be in a range of about 0.010 mm to about 0.100 mm. In another embodiment, the thickness of the anode current collector may be in a range of about 0.020 mm to about 0.070 mm. In yet another embodiment, the thickness of the anode current collector may be in a range of about 0.040 mm to about 0.060 mm. In one embodiment, the thickness of the anode current collector is about 0.050 mm.

Figure 2:
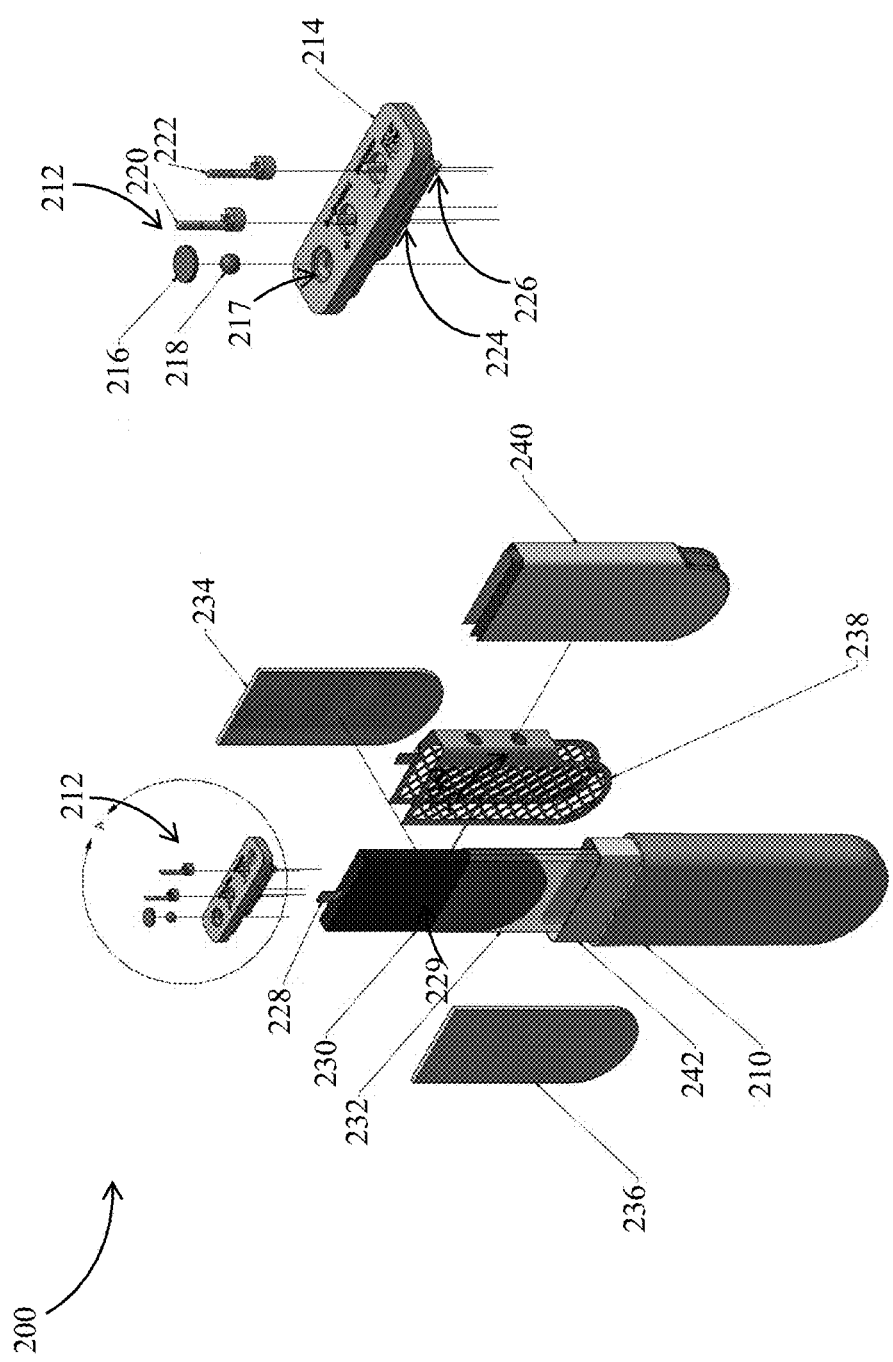
FIG. 2 illustrates an exploded view of an electrochemical cell, in accordance with an embodiment of the present invention.

Referring to FIG. 2, an exploded view 200 of an electrochemical cell is illustrated, in accordance with an embodiment of the present invention. The view 200 shows a cell container or casing 210 and a blow-up portion (Detail A 212) of header 214. The detail A 212 shows the header 214 to include an opening 217 for receiving a ball seal 218 which may then be sealed with a fill port cover 216, openings 224 and 226 for connecting a tab portion 229 of a cathode current collector 228 and a tab portion 239 of an anode current collector 238 to pin extenders 220 and 222 respectively. In one embodiment, the pin extenders 220 and 22 may be gold plated. The opening 217 may function as a vent in the cell. The view 200 also shows a cathode current collector 228, more particularly the tab portion 229 of the cathode current collector 228, encased in the cathode formulation in the form of a cathode pellet 230, a cathode separator pouch 232 encasing the cathode current collector 228 and the cathode pellet 230, two lithium foils 234, 236, an anode current collector 238 with the tab portion 239, an anode separator pouch 240, and an insulator pouch 242 that contains and insulates all the parts of the cell from the outer casing 210. The negative current output terminal i.e., pin extender 222 of the cell may be connected to the negative terminal pin, then connected to anode current collector tab portion 239.

Figure 4:
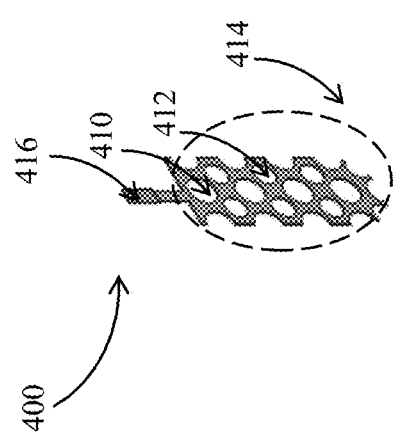
FIG. 4 illustrates a cathode current collector of an electrochemical cell, in accordance with an embodiment of the present invention.

Referring to FIG. 4, a cathode current collector of an electrochemical cell is illustrated, in accordance with an embodiment of the present invention. As shown in FIG. 4, the cathode current collector 400 includes a perforated stainless-steel plate that includes large circles 410 and small circles 412. As mentioned herein above, in one exemplary embodiment, the average diameter for the large circles is about 2.4 mm, the average diameter of the small circles is about 1.9 mm and the ratio of perforated area 410, 412 to the whole collector 414 (excluding the tabbing area 416) is 0.6.

Figure 5:
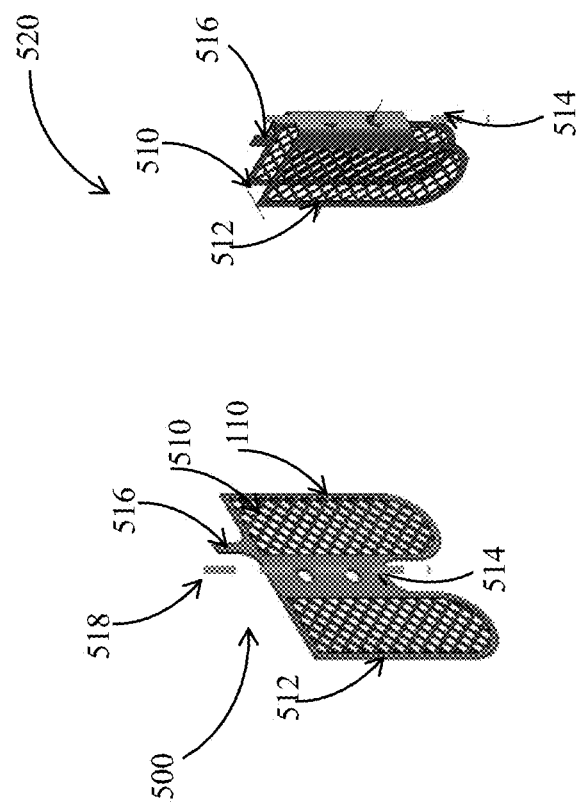
FIG. 5 illustrates an anode current collector of an electrochemical cell, in accordance with an embodiment of the present invention.

Referring to FIG. 5, an anode current collector of an electrochemical cell is illustrated, in accordance with an embodiment of the present invention. As shown in FIG. 5, the anode current collector 500 includes central portion 514 having two side perforated side portions 510, 512, and a tab portion 516 connected to one of the side portions. The anode current collector 500, in an exemplary embodiment is folded along the central alignment feature 514 along central axis 518 to form a book like structure shown in view 520. In one embodiment, the alignment feature 514 in the center of the anode current collector, may facilitate proper anode to anode current collector alignment and anode current collector folding, which are key steps in the cell construction. As described with reference to FIG. 3 hereinbelow, the anode current collector (anode) and the cathode current collector (cathode) in the cell are assembled in a manner such that the anode current collector sandwiches the cathode current collector. The two holes in the center of the anode current collector will allow the anode current collector to sit on a fixture stationary, and lithium foils can be pressed properly onto the anode current collector. Also, the two holes void of materials allow for easy folding of the anode current collector to form proper geometry sandwiching the cathode to fit into the cell case.

Figure 6:
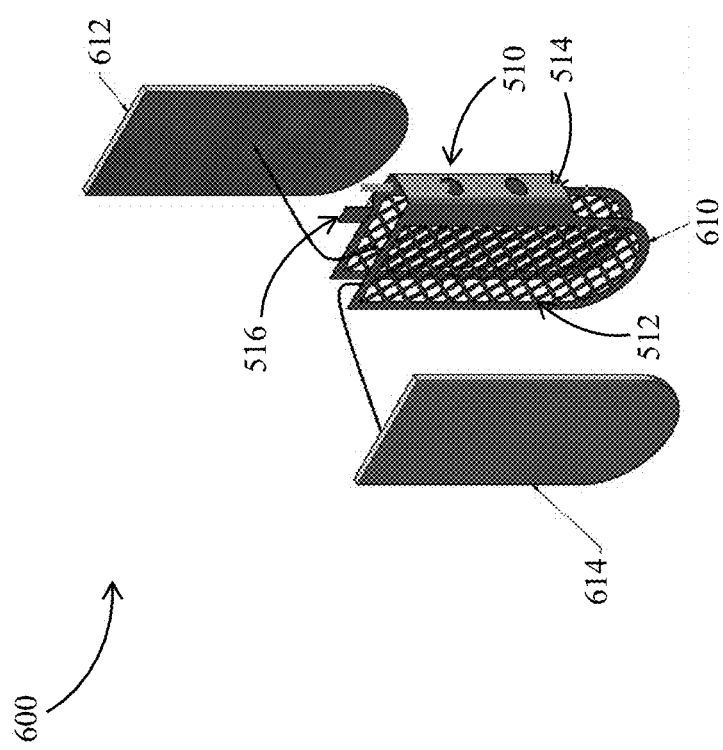
FIG. 6 illustrates an exploded view of an anode including an anode current collector and two lithium foils of an electrochemical cell, in accordance with an embodiment of the present invention.

Referring to FIG. 6, an exploded view of an anode including an anode current collector and two lithium foils of an electrochemical cell is illustrated, in accordance with an embodiment of the present invention. As shown in FIG. 6, lithium foils 612, 614 are then disposed onto the folded anode current collector 610 with sides 510, 512, the central alignment feature 514. In one embodiment, the lithium foils are pressed on to the perforated surface of the anode current collector. Likewise, other techniques now know known by those skilled in the art, or later developed, may be applied to dispose the lithium foil on to current collector.

Figure 7:
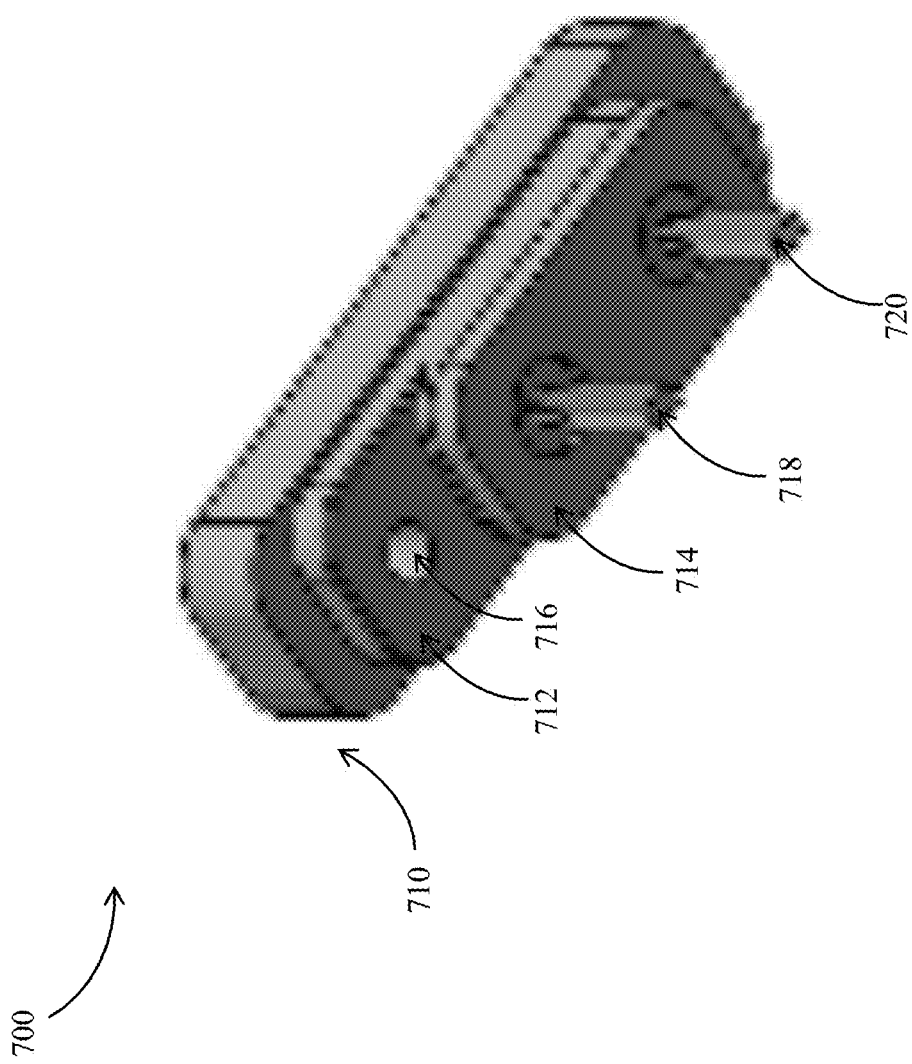
FIG. 7 illustrates a stepped header of an electrochemical cell, in accordance with an embodiment of the present invention.

In one embodiment, the electrochemical cell disclosed herein includes a stepped header design. In one embodiment, stepped header design consists of two or more steps in the header body profile. Referring to FIG. 7 is illustrated a stepped header of an electrochemical cell, in accordance with an embodiment of the present invention. As shown in view 700 in FIG. 7, the lower portion 710 of the header includes a first step 712, and a second step 714. The optimized stepped header design of the header may allow for increased or maximum internal cell volume. In one exemplary embodiment, the first step 712 may be designed around ball seal requirements and the second step 714 may be designed around glass-to-metal seal requirements. The first step 712 should have sufficient thickness so that the contact area of ball to header is adequate to hold the ball in place. The ball can be as small as possible so that the thickness of this step of header can be smaller than the thickness of the second step, thus yielding more cell internal volume. The first step includes an opening 716 which may be designed to receive the ball seal 218 and the fill port cover 216, described hereinabove, with reference to FIG. 2. The second step 714 step should have sufficient thickness so that the glass in the glass-to-metal seal can have sufficient thickness to form a hermetic seal. The second step 716 includes terminal pins 718 and 720 for connecting the tab portion 229 of the cathode current collector 228 and the tab portion 239 of the anode current collector 240 to pin extenders 220 and 222 respectively, as described hereinabove with reference to FIG. 2.

In one embodiment, the thickness of the first step may be in a range of about 0.7 mm to about 1.5 mm. In another embodiment, the thickness of the first step may be in a range of about 0.8 mm to about 1.4 mm. In yet another embodiment, the thickness of the first step may be in a range of about 0.9 mm to about 1.3 mm. In one embodiment, the first step of the header may have a thickness of about 1.1 mm. In one embodiment, the thickness of the second step may be in a range of about 1.1 mm to about 1.9 mm. In another embodiment, the thickness of the second step may be in a range of about 1.2 mm to about 1.8 mm. In yet another embodiment, the thickness of the second step may be in a range of about 1.3 mm to about 1.7 mm. In one embodiment, the second step of the header may have a thickness of about 1.5 mm.

Advantages of the stepped header design include an increased internal volume of the electrochemical cell, the utilization of which allows the cell to achieve electrolyte volume and void volume goals. It may be appreciated that those skilled in the art will, in light of the teachings of the present invention, that a proper selection of the amount of electrolyte and void volume may positively impact the cell energy density and the cell swelling. A sufficient amount of electrolyte is necessary for the cell to deliver desirable energy. But over fill of electrolyte in the cell may increase the risk of cell swelling because there will be less void volume that can be used for holding gas species formed as a result of side reactions in the cell. In one embodiment, the amount of electrolyte filled in a cell may be in a range of about 38 percentage to about 46 percentage based on the total internal volume of the cell. In another embodiment, the amount of electrolyte filled in a cell may be in a range of about 40 percentage to about 44 percentage based on the total internal volume of the cell. In yet another embodiment, the amount of electrolyte filled in a cell may be in a range of about 41 percentage to about 43 percentage based on the total internal volume of the cell. In one embodiment, the amount of electrolyte filled in a cell is about 42 percentage based on the total internal volume of the cell.

In one embodiment, the amount of void volume in a cell may be in a range of about 3 percentage to about 9 percentage based on the total internal volume of the cell. In another embodiment, the amount of void volume in a cell may be in a range of about 4 percentage to about 8 percentage based on the total internal volume of the cell. In yet another embodiment, the amount of void volume in a cell may be in a range of about 5 percentage to about 7 percentage based on the total internal volume of the cell. In one embodiment, the amount of void volume in a cell is about 6 based on the total internal volume of the cell.

In one embodiment, the ratio of the electrolyte volume to the void volume in a newly manufactured cell may be in a range of about 4.0 to about 10.0 based on the total volume of the cell. In another embodiment, the ratio of the electrolyte volume to the void volume in a newly manufactured cell may be in a range of about 5.0 to about 9.0 based on the total volume of the cell. In yet another embodiment, the ratio of the electrolyte volume to the void volume in a newly manufactured cell may be in a range of about 6.0 to about 8.0 based on the total volume of the cell. In one embodiment, the ratio of the electrolyte volume to the void volume in a newly manufactured cell may be about 7.0 based on the total volume of the cell.

In one embodiment, the electrolyte formulation includes a lithium salt in a mixed solvent. The electrolyte provides an ionic source serving as an electrical conducting carrier between the cathode and the anode during cell discharge. Suitable lithium salts may include, but are not limited to, $LiBF_4$, $LiAsF_6$, $LiSbF_6$, or $LiClO_4$, or a combination of two or more of these salts. In one embodiment, the solvent may include a mixture of two compounds. One compound having a low viscosity and the other compound having a high permittivity. Suitable examples of solvents having a low viscosity include, but are not limited to, 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, and diethyl carbonate. Suitable examples of solvents having a high permittivity include, but are not limited to, propylene carbonate (PC), ethylene carbonate (EC), γ-butyrolactone (GBL), and N-methyl-pyrrolidinone (NMP). In one embodiment, the lithium salt is $LiBF_4$, and the mixed solvent is composed of 1,2-dimethoxyethane (DME) and γ-butyrolactone (GBL). It may be appreciated that those skilled in the art will, in light of the teachings of the present invention, that the selected electrolyte may have a good electrical conductivity and chemical stability when in contact with both lithium anode and $CF_x$ cathode, thus aiding in elimination or minimizing of cell swelling.

In one embodiment, the electrolyte amount may be determined by the ratio of electrolyte amount to the amount of fluorinated carbon ($CF_x$). To maximize the energy density, as-much-as-possible electrochemical active materials should be filled into a cell. At the same time, each bit of the cathode active material should be in contact with the electrolyte, in order for each part of cathode to be active in contributing to discharge capacity. It may be appreciated that those skilled in the art will, in light of the teachings of the present invention, that adequate amount of electrolyte is needed to achieve high energy density. However, more than sufficient amount of electrolyte may cause lack of void volume in the cell, thus leading to cell swelling. It may be appreciated that those skilled in the art will, in light of the teachings of the present invention, that the ratio of electrolyte amount to the amount of fluorinated carbon ($CF_x$) should be properly determined. In one embodiment, the ratio of electrolyte amount to the amount of fluorinated carbon ($CF_x$) is in a range of about 0.7 to about 1.1. In another embodiment, the ratio of electrolyte amount to the amount of fluorinated carbon ($CF_x$) is in a range of about 0.8 to about 1.0. In yet another embodiment, the ratio of electrolyte amount to the amount of fluorinated carbon ($CF_x$) is in a range of about 0.9 to about 1.05. In one embodiment, the ratio of electrolyte amount to the amount of fluorinated carbon ($CF_x$) is about 0.93.

In one embodiment, the ratio of solvent one with low viscosity and the solvent two with high permittivity is, by volume, in a range of about 0.5 to about 1.5 In another embodiment, the ratio of solvent one with low viscosity and the solvent two with high permittivity is in a range of about 0.7 to about 1.3 In yet another embodiment, the ratio of solvent one with low viscosity and the solvent two with high permittivity is in a range of about 0.8 to about 1.2 In one embodiment, the ratio of solvent one with low viscosity and the solvent two with high permittivity is about 1.0.

In one embodiment, the amount of lithium salt to solvent mixture is in a range of about 0.8 moles per liter to about 1.2 moles per liter based on a total volume of the solvent. In another embodiment, the ratio of lithium salt to solvent mixture is in a range of about 0.9 moles per liter to about 1.1 moles per liter based on a total volume of the solvent. In yet another embodiment, the ratio of lithium salt to solvent mixture is in a range of about 0.95 moles per liter to about 1.05 moles per liter based on a total volume of the solvent. In one embodiment, the ratio of lithium salt to solvent mixture is about 1.0 moles per liter.

Figure 3:
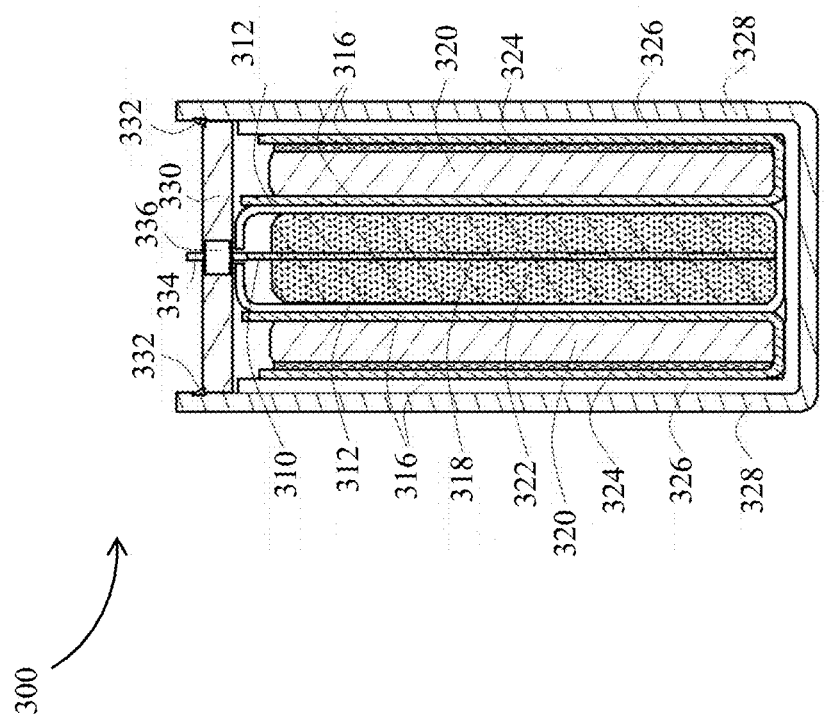
FIG. 3 illustrates a cross-sectional view of an electrochemical cell, in accordance with an embodiment of the present invention.

Referring to FIG. 3, a cross-sectional view of an electrochemical cell is illustrated, in accordance with an embodiment of the present invention. In the exemplary embodiment illustrated in FIG. 3, the view 300 of the electrochemical cell includes a cell case or battery case 328 which houses a cathode assembly including a cathode current collector 318 integrated with a cathode current collector tab 310 and encased in a cathode separator 312. The cathode pellet 322 is pressed on to the cathode current collector 318. The cell also includes an anode assembly including an anode 320 pressed on to the anode current collector 324 and encased in an anode separator 316. The anode assembly sandwiches the cathode assembly. The anode assembly and the cathode assembly are then encased in an insulator pouch 326 which is covered by the cell casing 328. The cell may be closed with a stepped header 330 which is welded on its circumference with the cell casing by forming welding rings 332.

The header includes a feed thru pin 334 for connection to device and glass to metal seal 336 to prevent leakage of electrolyte, solvents, etc. . . . . . In the exemplary embodiment illustrated in FIG. 3, the cathode current collector has a thickness of about 0.075 mm, is made of stainless steel, has perforations formed of large circles (average diameter of about 2.4 mm) and small circles (average diameter of about 1.9 mm), cathode pellet 322 is composed of fluorinated carbon ($CF_x$), carbon black and binder in a ratio of about 90:6:4, ratio of perforated area to total area of cathode current collector is about 0.6 and cathode is coated with a 0.05 mm thick layer of conductive carbon (not shown in figure). The anode current collector includes a lithium metal foil 320 pressed on the anode current collector 324, the anode current collector has a thickness of 0.05 mm, is made of stainless steel, has diamond shaped perforations, and ratio of perforated area to total area of anode current collector is about 0.6. The electrolyte used includes lithium salt is $LiBF_4$, and mixed solvent composed of 1,2-dimethoxyethane (DME) and γ-butyrolactone (GBL), and the ratio of electrolyte amount to the amount of fluorinated carbon ($CF_x$) is about 0.93.

In one embodiment, the separator may be selected from those commercially available separators. As known to those skilled in the art, the separator is typically an electrically non-conducting porous electrolyte-filled membrane, which is sandwiched between and in contact with the cathode and anode. Its role is to prevent direct electronic contact between cathode and anode, thus avoiding a short-circuit between the two electrodes, to allow the flow of ionic species within the cell. The separator should be chemically stable while in contact with each of the cathode, anode and electrolyte. The function and reliability of the separator is critical for the optimal performance of lithium batteries. The separator affects the internal cell resistance, discharge rates and cell stability. The separator material in this invention is selected based on its stability, porosity, thickness and strength, to allow good ionic conductivity as well as to maintain stability. In one embodiment, the separator may have a thickness in a range of about 0.010 mm to about 0.035 mm. In one embodiment, the separator may have a porosity of about 40 percent to about 60 percent. In various embodiments, separator may include one layer of polymer material, or multi-layer polymer materials. Suitable examples of separator material may include, but are not limited to, monolayer polypropylene, or can be tri-layer that consist of two layers of polypropylene, and sandwiching monolayer of polyethylene. The stability of the separator contributes to non-swelling of the lithium battery during deep discharge.

According to an embodiment of this invention, the case material (outer casing) for the cell may be made of titanium or stainless steel. In one embodiment, the case material is titanium, as titanium allows good compatibility with body fluid while the battery is implanted into human body.

EXPERIMENTAL

Example 1 provides construction details of an anode sample of an electrochemical cell in accordance with embodiments of the present invention.

In Example 1, anode of the electrochemical cell is constructed using two metallic lithium foils and a perforated current collector made of stainless steel. The stainless steel perforated current collector is perforated. FIG. 5 represents a stainless steel perforated current collector as described in Example 1. As shown in FIG. 5, in the exemplary embodiment provided in Example 1, the perforations may consist of diamond shapes. The stainless steel perforated current collector accordingly has a void area and a total area. The stainless steel perforated current collect of Example 1, has a ratio of perforated void area to the total area of current collector (excluding the central folding and tabbing area) of about 0.6. The thickness of the stainless steel perforated current collector is about 0.050 millimeters. The negative terminal 222 of the electrochemical cell is connected to the tab portion 516, 239 of the stainless steel perforated anode current collector.

Example 2 provides construction details and swelling characteristics of an Li/CF$_x$ electrochemical cell in accordance with embodiments of the present invention.

Figure 8:
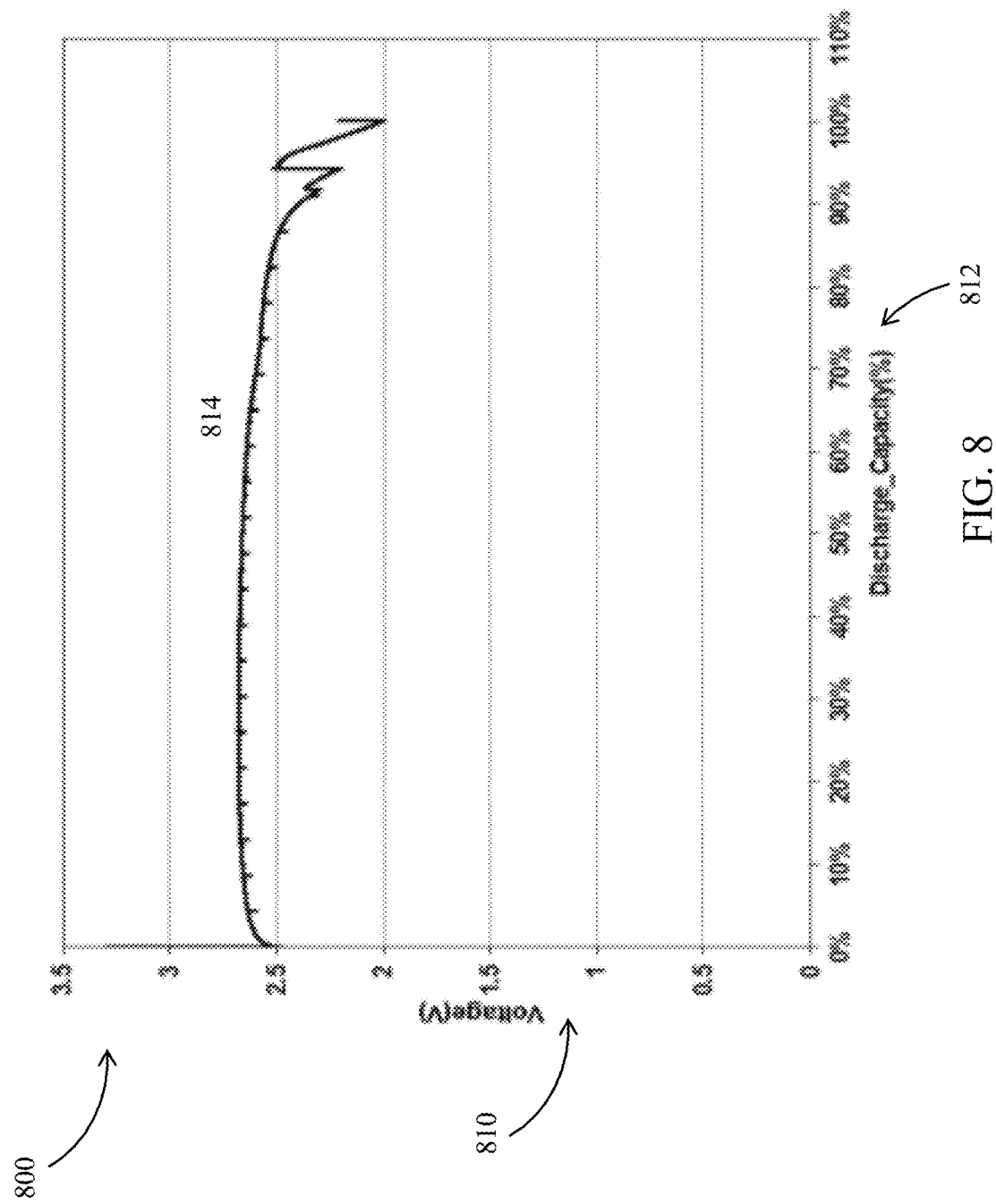
FIG. 8 is a graph illustrating a discharge curve of an Li/CF$_x$ electrochemical cell, constructed in accordance with embodiments of the present invention.

One Li/CF$_x$ cell was constructed according to preferred embodiments of the present inventions as described with reference to FIG. 3 hereinabove. The cell was discharged by a 5-day accelerated protocol (as in FIG. 8) to 2.0 Volts. For testing of a medical battery, the test duration of three months to six months is not unusual. The 5-day protocol allow a faster output of the testing. The swelling observed for the cell is about 1.0 percent. As mentioned herein, "swelling" is defined/calculated as the difference in the cell thickness between the cell in a discharged state and the cell in an undischarged state divided by the thickness of the cell in the undischarged state. Referring to FIG. 8 is shown a graph illustrating a discharge of an Li/CF$_x$ an electrochemical cell, constructed in accordance with embodiments of the present invention. The graph 800 includes Voltage on Y-Axis 810 and Discharge capacity in percentage on X-axis 812. The Cell constructed in Example 2, was discharged from 2.5 V to 2.0 V in a 5-day accelerated protocol and the percentage of discharge capacity was plotted as curve 814.

Example 3 provides construction details and swelling characteristics of two Li/CF$_x$ electrochemical cells in accordance with embodiments of the present invention.

Figure 9:
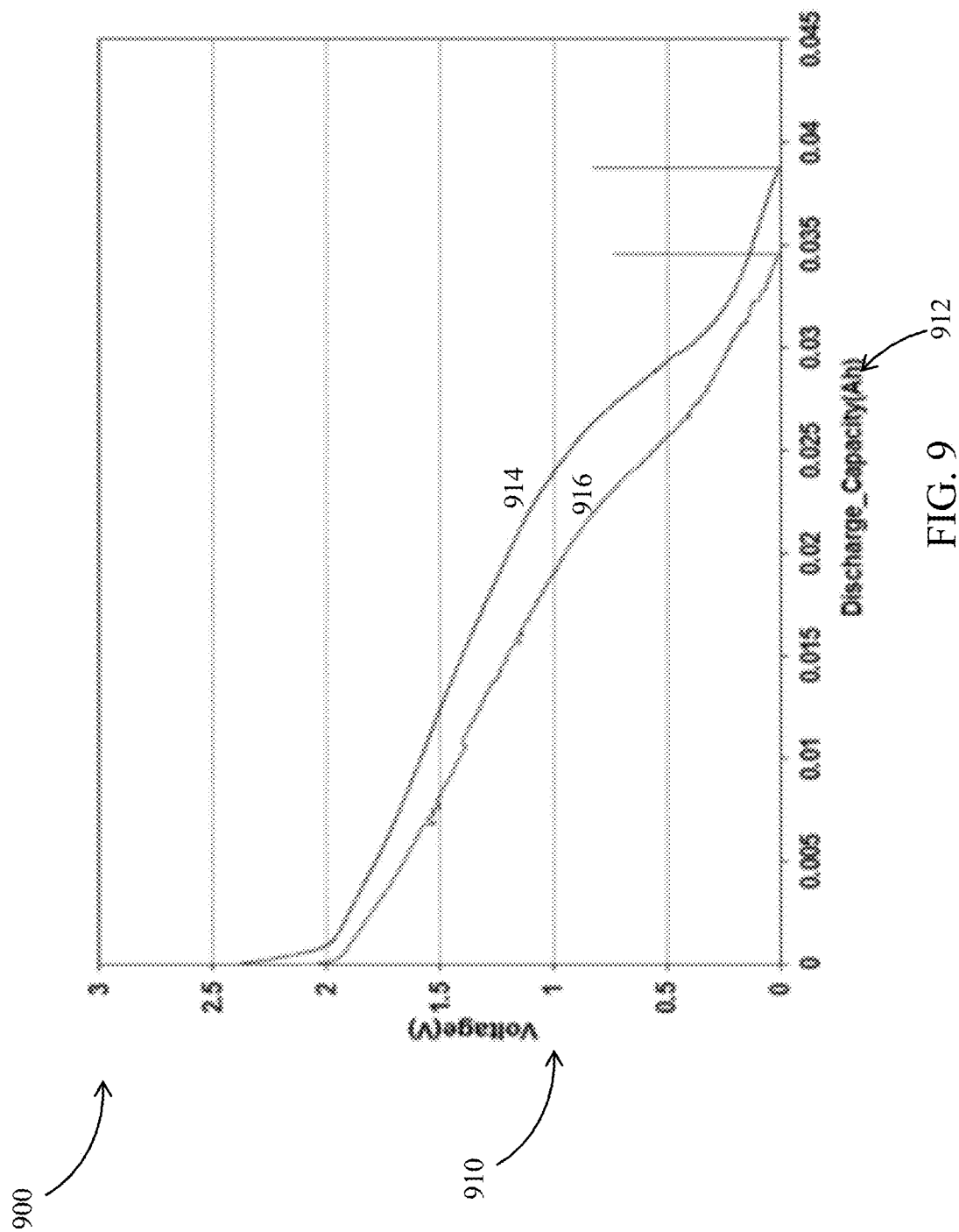
FIG. 9 is a graph illustrating deep discharge of an Li/CF$_x$ an electrochemical cell, constructed in accordance with embodiments of the present invention.

Two Li/CF$_x$ cells were constructed according to preferred embodiments of the present inventions as described with reference to Example 2 above. The two cells were discharged under a 5-day accelerated protocol. Referring to FIG. 9 is shown a graph illustrating deep discharge of two Li/CF$_x$ electrochemical cells, constructed in accordance with embodiments of the present invention. The graph 900 includes Voltage on Y-Axis 910 and Discharge capacity on X-axis 912. The Cells constructed in Example 3, were discharged from 2.5 V to 2.0 V in a 5-day accelerated protocol and the discharge capacity was plotted as curve 914 for cell 1, and curve 916 for cell 2. After discharge of the two cells to 0.01V (as shown in FIG. 9), the cell swelling was calculated as about 0.5 percent for cell 1, and about 1.0 percent for cell 2, when calculated as described hereinabove in Example 2 in comparison to the dimensions of undischarged cells.

Example 4 provides construction details and swelling characteristics of twenty-four Li/CF$_x$ electrochemical cells in accordance with embodiments of the present invention.

Figure 10:
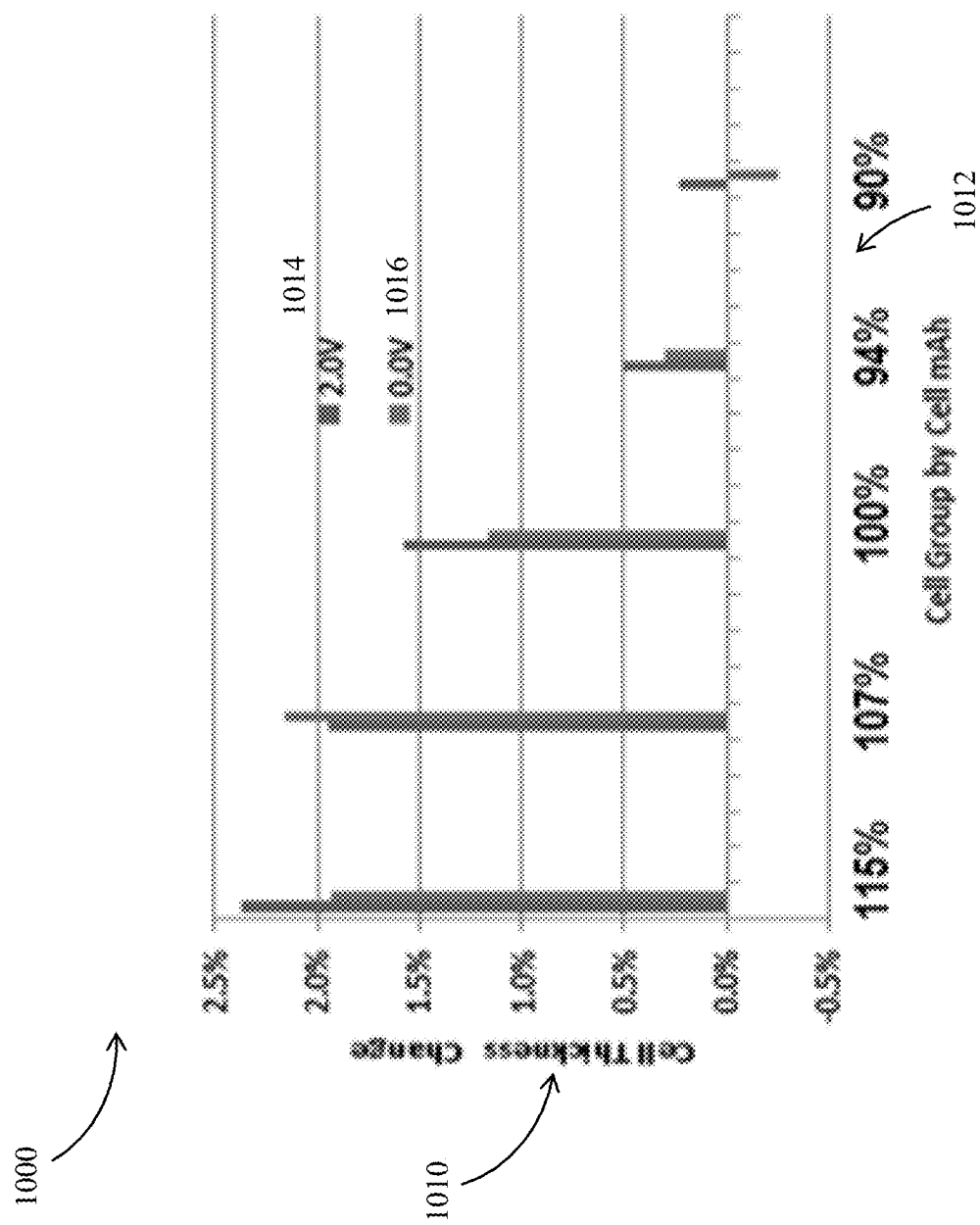
FIG. 10 is a graph illustrating a degree of swelling of twenty-four Li/CF$_x$ electrochemical cells, constructed in accordance with embodiments of the present invention.

Twenty-four Li/CF$_x$ cells were constructed according to preferred embodiments of the present inventions as described with reference to Example 2 above. These twenty-four cells were first discharged to 2.0 Volts by an accelerated protocol and the cell thickness was measured at this stage. The cells were then discharged to 0.0 Volts at 250 micro Amperes, and the cell thickness was measured again. Referring to FIG. 10 is a shown graph illustrating a degree of swelling of twenty-four Li/CF$_x$ electrochemical cells, constructed in accordance with embodiments of the present invention. The graph 1000 includes cell thickness change in percentage on Y-Axis 1010 and cell group by cell milliamp hour X-axis 1012. The Cells constructed in Example 4, were discharged as described herein. FIG. 10 summarizes the swelling data of the twenty-four cells while the cells were discharged to 2.0 V and further to 0.0 V. The swelling at 2.0 Volts for the 100 percent milliamp hour group is only about 1.5 percent. As observed in FIG. 10, there is a general trend that the swelling of cell after discharge to 0.0 Volts is lesser than that after discharge to 2.0 Volts, even some cells shrunk after discharge to 0.0V (see 90 percent milliamp hour group in FIG. 10). This may be attributed to the fact that the density of the discharge product i.e., carbon and LiF is greater than the density of the reactants i.e., Li and CF$_x$, and thus less volume is needed to hold the solids inside the container. Further, the internal pressure of the cell is less than the external air pressure, causing the shrinking of the cell, and hence a reduction in the cell thickness.

In one embodiment, the electrochemical cell disclosed herein includes an electrochemical cell with high specific energy, low self-discharge rate, and minimal swelling during deep discharge, particularly for an implantable medical device. For example, the electrochemical cell may be useful in implantable cardiac monitor (ICM) devices or other implantable medical products. In various embodiments, the optimized selection of materials, i.e., the materials for cathode, electrolyte, separator, current collector, header, and cell case, and the optimized designs, i.e., the design of the cathode current collector, design of the anode current collector, anode to cathode ratio, electrolyte to cathode ratio, void volume ratio, etc . . . , in the present disclosure may result in reduced gassing and minimal swelling during deep discharge of the electrochemical cell.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

The foregoing embodiments meet the overall objectives of this disclosure as summarized above. However, it will be clearly understood by those skilled in the art that the foregoing description has been made in terms only of the most preferred specific embodiments. Therefore, many other changes and modifications clearly and easily can be made that are also useful improvements and definitely outside the existing art without departing from the scope of the present disclosure, indeed which remain within its very broad overall scope, and which disclosure is to be defined over the existing art by the appended claims.

The invention claimed is:

1. An electrochemical cell comprising:
   a cathode, wherein the cathode comprises a cathode formulation comprising a cathode active material, a conductive carbon filler, and a binder, wherein the cathode formulation is disposed on a cathode current collector;
   an anode, wherein the anode comprises at least one lithium metal foil disposed on an anode current collector;
   a header comprising a stepped header comprising a first step and a second step, and a first opening, a second opening, and a third opening, wherein
      an upper surface of the first step is disposed directly on a lower surface of the header and an upper surface of the second step is disposed directly on a lower surface of the first step, the first opening has a length extending from an upper surface of the header, through a thickness of the header and a thickness of the first step, and to a bottom surface of the first step, the first opening in the first step is configured for a ball seal, the second opening and the third opening each have a length extending from an upper surface of the header, through the thickness of the header, the thickness of the first step, and a thickness of the second step, and to a bottom surface of the second step, wherein a first terminal pin for connection to a cathode tab portion extends through the length of the second opening and a second terminal pin for connection to an anode tab portion extends through the length of the third opening, and the second opening and the third opening in the second step are configured for a glass seal; and an electrolyte, wherein the electrolyte comprises a lithium salt in a mixed solvent;

wherein the electrochemical cell has an internal volume including an electrode, a separator, an electrolyte volume, and a void volume, and the electrolyte volume is in the range of 38 percent to 46 percent of the internal volume, and wherein the electrochemical cell has a swelling percentage of less than or equal to about 2 percent.

2. The electrochemical cell of claim 1, wherein the cathode active material is $CF_x$, conductive carbon filler is carbon black, and binder is polytetrafluoroethylene in a ratio of about 90:6:4.

3. The electrochemical cell of claim 1, wherein the cathode active material is blended with the binder and the conductive carbon filler to form a pellet, and the pellet is disposed on the cathode current collector.

4. The electrochemical cell of claim 1, wherein the cathode current collector comprises perforations.

5. The electrochemical cell of claim 4, wherein the perforations comprise large circles and small circles and wherein the average diameter for the large circles is about 2.4 mm and the average diameter for the small circles is about 1.9 mm.

6. The electrochemical cell of claim 4, wherein a ratio of area comprising the perforations to a whole area of the cathode current collector is about 0.6.

7. The electrochemical cell of claim 1, wherein the cathode current collector has a thickness of about 0.6 to 0.8 mm.

8. The electrochemical cell of claim 1, wherein the cathode current collector is coated with conductive carbon.

9. The electrochemical cell of claim 8, wherein the conductive carbon coating has a thickness of about 0.080 mm.

10. The electrochemical cell of claim 1, wherein the anode current collector comprises perforations, wherein the perforations comprise a diamond shape, a circle, an oval, a rectangle, a star, a triangle, and combinations thereof.

11. The electrochemical cell of claim 10, wherein ratio of a perforated area to a total area of the anode current collector is about 0.6.

12. The electrochemical cell of claim 1, wherein the anode current collector has a thickness of about 0.050 mm.

13. The electrochemical cell of claim 1, wherein a ratio of an amount of electrolyte to an amount of cathode active material is in a range of about 0.7 to 1.1.

14. The electrochemical cell of claim 1, wherein a ratio of an amount of electrolyte to an amount of cathode active material is 0.93.

15. The electrochemical cell of claim 1, wherein the first step has a thickness of about 1.1 mm and the second step has a thickness of about 1.5 mm.

16. The electrochemical cell of claim 1, wherein the lithium salt is present in an amount in a range of about 0.8 moles per liter to about 1.2 moles per liter based on a total volume of the solvent in the electrolyte.

17. An implantable device comprising:
the electrochemical cell of claim 1, wherein
a ratio of an amount of electrolyte to an amount of cathode active material is about 0.93.

18. The electrochemical cell of claim 1, wherein the electrolyte volume is in the range of about 40 percent to about 44 percent of the internal volume.

19. The electrochemical cell of claim 1, wherein the electrolyte volume is in the range of about 41 percent to about 43 percent of the internal volume.

20. The electrochemical cell of claim 1, wherein the electrolyte volume is about 42 percent of the internal volume.

21. The electrochemical cell of claim 1, wherein the void volume is in the range of about 3 percent to about 9 percent of the internal volume.

22. The electrochemical cell of claim 1, wherein the void volume is in the range of about 4 percent to about 8 percent of the internal volume.

23. The electrochemical cell of claim 1, wherein the void volume is in the range of about 5 percent to about 7 percent of the internal volume.

24. The electrochemical cell of claim 1, wherein the void volume is about 6 percent of the internal volume.

25. The electrochemical cell of claim 1, wherein the length of the first step is less than a length of the header, and a length of the second step is less than a length of the first step.

26. The electrochemical cell of claim 1, wherein the entire upper surface of the first step is disposed directly on the lower surface of the header and the entire upper surface of the second step is disposed directly on a lower surface of the first step.

* * * * *